US006208455B1

(12) United States Patent
Ueno et al.

(10) Patent No.: US 6,208,455 B1
(45) Date of Patent: Mar. 27, 2001

(54) WAVELENGTH CONVERTER

(75) Inventors: Yoshiyasu Ueno; Kazuhito Tajima; Shigeru Nakamura, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/082,822

(22) Filed: May 21, 1998

(30) Foreign Application Priority Data

May 23, 1997 (JP) .................................................. 9-133407

(51) Int. Cl.$^7$ ...................................................... G02F 1/365

(52) U.S. Cl. .............................. 359/332; 385/27; 385/122

(58) Field of Search .................................. 359/326–332; 385/15, 27, 39, 42, 122

(56) References Cited

U.S. PATENT DOCUMENTS 5,335,106 * 8/1994 Paquin et al. ..................... 359/326 X
5,771,097 * 6/1998 Kusunose et al. ................... 356/520
6,115,520 * 9/2000 Laskowski et al. .................. 385/50

FOREIGN PATENT DOCUMENTS 0875782   11/1998  (EP) .
7-199250   8/1995  (JP) .
8-334796 * 12/1996  (JP) .

OTHER PUBLICATIONS

Zucchelli et al., "New Solutions For optical packet delineation and in synchronization optical packet switched networks," ECOC '96. 22$^{nd}$ European Conference on Optical Communication, (IEEE Cat. No. 96TH8217), Proceedings of European Conference on Optical Communication, Oslo, Norway, Sep. 15–19, 1996, pp. 301–304, vol. 3, XP002131871, 1996, Kjeller, Norway, Telenor, Norway, ISBN: 82–423–0418–1, * figure 5 *.

Stubkjaer et al., "Wavelength conversion devices and techniques," Proceedings of the 1996 22$^{nd}$ European Conference on Optical Communication, ECOC. Part 4 (of 6); Oslo, Norway, Sep. 15–19, 1996, vol. 4, 1996, pp. 33–40, XP002131872 Eur. Conf. Optc. Commun ECOC; European Conference on Optical Communicati0on, ECOC. 1996 IEEE, Piscataway, NJ, USA, Chapter: Converters based on optically controlled gates.

IDLER et al., "Chirp–free 2.5–GBIT/S Signal Generation By a Monolithic Mach–Zehnder Interferometer Wavelength Converter and Transmission Over 188 KM of Standard Fiber," Optical Fiber Communication, New York, US, IEEE, 1995, pp. 73–74, XP000517653 ISBN: 0–7803–2654–7, * the whole document *.

Kazutaka et al., *Appl. Phys. Lett.*, 65 (19): pp. 2445–2447 (1994)(Nov.).

Terji Durhuus et al., *Journal of Lightwave Technology*, vol. 14, No. 6, pp. 942–954 (1996)(Jun.).

(List continued on next page.)

Primary Examiner—John D. Lee
(74) Attorney, Agent, or Firm—Ostrolenk, Faber, Gerb & Soffen, LLP

(57) ABSTRACT

Disclosed is a wavelength converter that is appropriate for long-distance large-capacity optical communication, a wavelength converter according to the present invention includes: waveguides 1 and 2 for producing nonlinear changes in refractive indices; light interaction circuits 3 and 4; and light delay circuits 9 and 10. When an input signal pulse interval is denoted by $T_o$ and a speed at which signal pulse light proceeds through a delay circuit is denoted by $v_g$, a difference $\Delta L_d$ for optical paths in the light delay circuits satisfies a relation $\Delta L_d = v_g T_o/2$. As a result, when there is an interaction involving two sequential light beams, the phases of which are demodulated by the input signal pulse, the wavelength chirping affecting the light beams is canceled out.

7 Claims, 4 Drawing Sheets

OTHER PUBLICATIONS

S. Nakamura et al., *Appl. Phys. Lett.*, 62 (9): pp. 925–927 (1993)(Mar.).

K. Tajima et al., *Appl. Phys. Lett.*, 67 (25): pp. 3709–3711 (1995)(Dec.).

N.S. Patel et al., IEEE Photonics Technology Letters, vol. 8, No. 12, pp. 1695–1697 (1996)(Dec.).

* cited by examiner

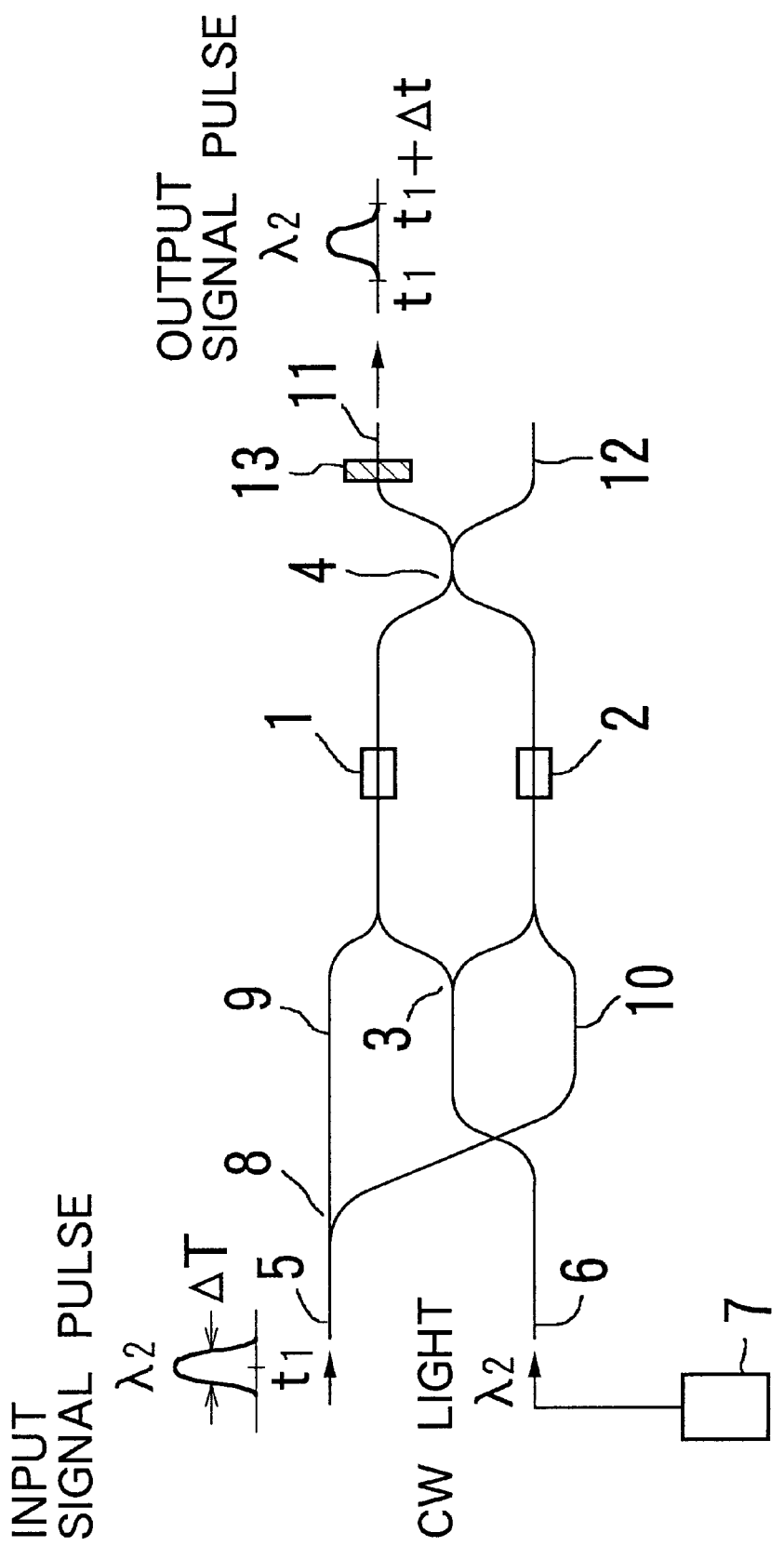

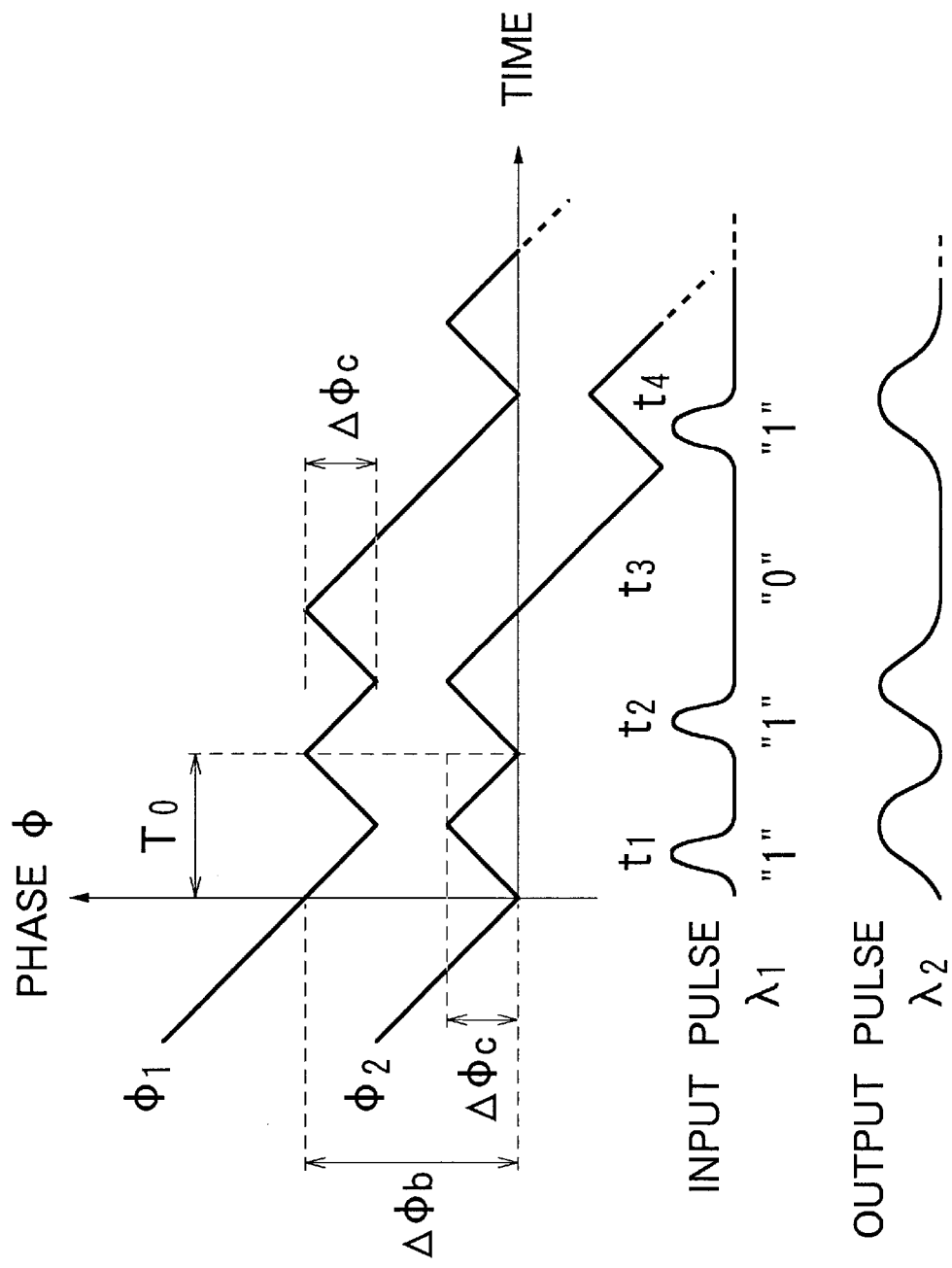

WAVELENGTH CONVERTER

BACKGROUND OF THE INVENTION

1. Field of the Invention

The present invention relates to a wavelength converter for use in wavelength division multiplex (WDM) optical communication, and more particularly for use in high-speed WDM optical communication, and to a method for removing wavelength chirping from such a wavelength converter.

2. Related Arts

In recent years, WDM optical communication has been developed into a mass optical communication system. With this WDM optical communication system, each wavelength in a light signal is allocated to an individual communication channel, and therefore, in order for a signal to be transmitted or to be received from another channel, it is necessary for the wavelength of the original signal string to be converted into a wavelength that is suitable for a second channel. For conversion of a signal wavelength using a conventional optical device, a light signal must first be converted into an electrical signal, which then must be converted into a light signal having a different wavelength.

On the other hand, research has recently been performed employing a device that is so designed that it converts optical signal wavelengths directly, without converting them to electrical signals first. And there has been some discussion of proposed interactive devices, such as a symmetrical Mach Zender device and a deflected light isolation device. There has also been a report of the use as an optical switch of the symmetrical Mach Zender type wavelength converter ("Applied Physics Letters," by S. Nakamura, et. al., vol. 67, pp. 2445) that has one of the same features as has a wavelength converter: it produces output signal pulses having wavelengths that differ from those of input signal pulses. This symmetrical Mach Zender type wavelength converter has the configuration shown in FIG. 1, in which two waveguides that can produce changes in nonlinear refractive indices are arranged along the respective arms of a Mach Zender interferometer. If a signal having a pulse width that is sufficiently shorter than $\Delta t$ is input at time $t_1$ and time $t_1 + \Delta t$, a light pulse is output that has a first transition time $t_1$ and a last transition time $t_1 + \Delta t$. Further, a wavelength converter having the above described structure, with the exception that an optical delay circuit is arranged differently, is disclosed by S. Nakamura, the present inventor, in Japanese Unexamined Patent Publication No. Hei 7-199240.

The operating principle of an XPM type wavelength converter differs from that of a symmetrical Mach Zender wavelength converter in that it produces an output signal having substantially the same pulse as that of an input signal ("Journal of Lightwave Technology," by T. Durhuus, et. al., vol. 14, pp. 942). However, the XPM wavelength converter, as well as the symmetrical Mach Zender wavelength converter, has a configuration in which two waveguides that produce changes in nonlinear refractive indices are arranged along the respective arms of a Mach Zender interferometer.

One problem arising from the use of these wavelength converters is that an output signal pulse produces a great deal of wavelength chirping. The wavelength chirping occurs because the changes in the nonlinear refractive indices at the waveguides alter the phase of a signal pulse light. A specific example of the wavelength chirping produced by the XPM wavelength converter is reported by Durhuus et al. in the above reference.

SUMMARY OF THE INVENTION

It is, therefore, an object of the present invention to provide a wavelength converter that prevents the occurrence of wavelength chirping.

It is another object of the present invention to provide a wavelength converter that outputs a signal pulse that has no wavelength chirping and that has a frequency that is an integral multiple of that of an input signal pulse.

It is a further object of the present invention to provide a method for reducing or removing the occurrence of wavelength chirping in a wavelength converter.

To achieve the above objects, in one aspect, a wavelength converter according to the present invention comprises:

a waveguide for producing a change in a nonlinear refractive index;

a light interaction circuit that includes a light branching section and a light combining section;

a light delay circuit; and a continuous-wave light(hereinafter referred to as a CW light) source, wherein a difference ($\Delta L_d$) in optical paths provided in the light delay circuit satisfies $\Delta L_d = v_g T_o / 2$, where $T_o$ indicates an input signal pulse interval and $v_g$ indicates a speed at which a signal pulse light proceeds through the light delay circuit.

A wavelength converter according to the present invention, in another aspect, produces a $\pi/2$ or greater change in a refractive index at the nonlinear waveguide.

A wavelength converter for reducing or removing the occurrence of wavelength chirping according to the present invention comprises a waveguide for producing a change in a nonlinear refractive index, a light interaction circuit including a light branching section and a light combining section, a light delay circuit and a sequential light source, whereby an interval $T_o$ between input signal pulses is so set that a condition $\Delta L_d = v_g T_o / 2$ is satisfied, with $\Delta L_d$ denoting a difference in optical paths provided in said light delay circuit and $v_g$ denoting a speed at which a signal pulse light proceeds through said light delay circuit.

The basic operation of the wavelength converter of the present invention controls transient changes in the phases of two different CW lights that proceed separately through the wavelength converter, and cancels out wavelength chirping before the two lights interact to produce an output pulse signal.

BRIEF DESCRIPTION OF THE DRAWINGS

FIG. 1 is a diagram illustrating the basic structure of the present invention;

FIG. 3 is a diagram explaining the process performed by the present invention.

DETAILED DESCRIPTION OF THE PREFERRED EMBODIMENTS

Figure 2A:
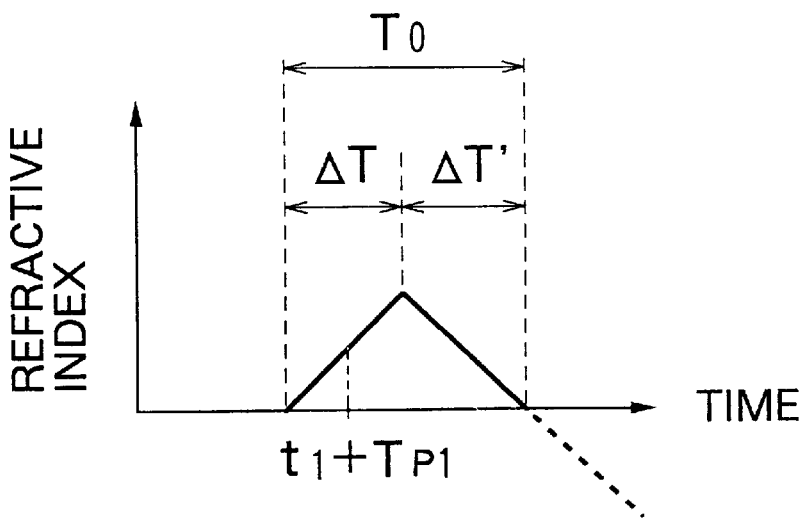
FIGS. 2A, 2B and 2C are graphs explaining the process performed by the present invention.

A wavelength converter according to a first embodiment of the present invention will be described. FIG. 1 is a diagram showing, as an example, the structure of a symmetrical Mach Zender wavelength converter, which comprises two waveguides (hereinafter referred to as nonlinear waveguides 1 and 2) for producing linear refractive indices; a light interaction circuit, including a light branching section 3 and a light combining section 4; an input signal port 5; and a CW light source 7 (a wavelength of $\lambda_2$) for transmitting CW light to an input port 6. The light interaction circuit and a light delay circuit may be formed using a semiconductor waveguide, or using a quartz waveguide or an optical fiber. In FIG. 1, an input signal pulse having a wavelength of $\lambda_1$ (pulse width=$\Delta T$) is converted into a signal having a wavelength of $\lambda_2$.

A signal pulse, which is received at the input port 5 at time $t_1$, is first branched into two signal pulses by the light branching section 8. One signal pulse is passed through a channel 9 and reaches the nonlinear waveguide 1 at time $t_1+T_{P1}$ ($T_{P1}$ is a time required for a signal pulse at the input port 5 to reach the nonlinear waveguide 1). The other signal pulse is passed through a channel 10 and reaches the nonlinear waveguide 2 at time $t_1+T_{P2}$. These channels 9 and 10 also serve as light delay circuits, and an optical path difference $\Delta L_d$ is employed to determine a delay time $\Delta t=T_{P2}-T_{P1}=\Delta L_{d/vg}$. The input signal pulse changes the refractive indices of the nonlinear waveguides 1 and 2 at time $t_1+T_{P1}$ and time $t_1+T_{P2}$, respectively.

In FIG. 2A is shown a transient change in the refractive index of the nonlinear waveguide. A semiconductor light amplifier is used as the nonlinear waveguide. The refractive index of the waveguide is increased when the center of the signal having a pulse width $\Delta T$ reaches time $t_1+T_{P1}$, or from time $t_1+T_{P1}\Delta T/2$ to time $t_1+T_{P1}+\Delta T/2$, thereafter the refractive index of the waveguide is reduced. The refractive index change is produced by a change in the carrier density in the waveguide shown in FIG. 2B (called a band-filling effect).

Figure 2B:
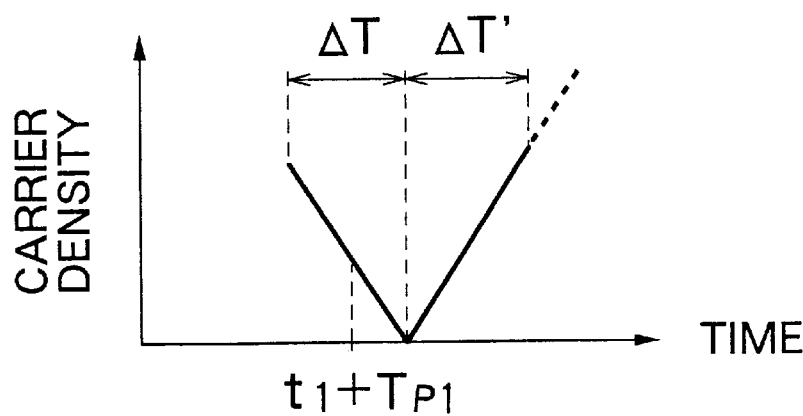
Figure 2C:
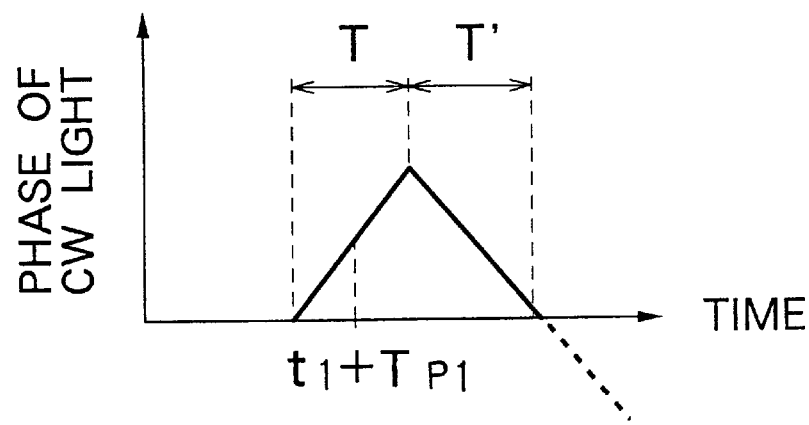

First, a carrier is emitted and re-coupled as the signal pulse is amplified, and the carrier density is reduced. Then, the carrier density after the amplification of the light is recovered (increased) by injecting a current into the light amplifier. As a result of the change in the refractive index shown in FIG. 2A, the phase of CW light that passes through the nonlinear waveguide is altered as is shown in FIG. 2C. In this example, the recovery time for the carrier density is denoted by $\Delta T'$.

The semiconductor light amplifier has been used as a nonlinear waveguide, but a semiconductor waveguide into which no current is injected (hereinafter referred to as a light absorption waveguide) may be used instead. In this case, since a signal pulse is absorbed at the waveguide and a carrier density is increased and is then reduced, all the signs for the refractive index change (FIG. 2A), the carrier density change (FIG. 2B) and the phase transition (FIG. 2C) are inverted. The time at which the carrier density is increased is determined by the signal pulse width ($\Delta T$), and the reduction time is determined by the time defined by the emission and recoupling of carriers, and non-emission and recoupling.

The time $\Delta T'$ for the conventional wavelength converter is considerably longer than time $\Delta T$. On the other hand, for the wavelength converter of the present invention, the time ($\Delta T'$) required for recovering the carrier density is equal to the signal pulse width ($\Delta T$). Conventionally, it is assumed that the pulse width is equal to or less than the 10 ps width of a mode lock laser pulse, and that a period equivalent to the lifetime of a carrier (about 100 ps to 10 ns) in a semiconductor is required for recovering the carrier density. When the repetition of the signal pulses is considerably slower than the reciprocal ($1/\Delta T$) of a pulse width, a period equivalent to the life of the carrier (about 100 ps to 10 ns) in the semiconductor is required to recover the carrier density. In the present invention, however, the repetition of the signal pulses is close to $1/\Delta T$. Therefore, even when a signal pulse is repeatedly input to the light amplifier, laser oscillation, which is an obstacle to light amplification, is restricted, so that a large current can be injected and $\Delta T=\Delta T'$ can be obtained. Similarly, when a signal pulse is repeatedly input to a light absorption waveguide, the average carrier density is increased, the emission/non-emission recoupling of the carriers can be performed rapidly, and $\Delta T=\Delta T'$ can be acquired.

An explanation will now be given, while referring to FIG. 1, for the action of a CW light having a wavelength of $\lambda_2$ that is input to the symmetrical Mach Zender wavelength converter. The CW light input at the input port 6 is branched by the branching section 3, and the branched light elements pass through the respective nonlinear waveguides 1 and 2 and interact at the combining section 4. The combined light is then output at an output port 11. As is well known, it is important for the two CW light elements output by the branching section 3 to reach the combining section 4 at almost the same time in order for them to satisfactorily interact with each other at the combining section 4. It is assumed that the branched CW light elements also reach the nonlinear waveguides 1 and 2 at the same time. The change in the phase of the CW light that reaches the nonlinear waveguide 1 is already shown in FIG. 2C. The phase of the CW light that reaches the nonlinear waveguide 2 is changed by the insertion of a delay of $\Delta t$. In this invention, since $\Delta L_d=v_gT_e/2$, the condition $\Delta t=T_e/2$ is satisfied.

In FIG. 3 are shown phases $\phi_1$ and $\phi_2$ of the two CW light elements that reach the combining section 4 (before interacting with each other) after their phases have been changed by the respective waveguides. In FIG. 3 is an example where four binary signal pulses "1101" are received. The signs of the changes for the phases $\phi_1$ and $\phi_2$ are inverted during a period extending from time $t_1+T_{P1}+T_{Q1}-\Delta T/2$ to time $t_1+T_{P1}+T_{Q1}+\Delta T/2$. (In FIG. 3, $t_1+T_{P1}+T_{Q1}$ is represented by $t_1$ for simplification, and $T^Q_1$ denotes a period required for the pulse to reach Y2 from WG1.) The field intensities $E_1$ (t) and $E_2$ (t) of the CW light elements are represented by the following equations (1) and (2).

$$E_1(t)=\overline{E}_0\exp(-i\phi_1)=\overline{E}_0\exp(-i\Delta\omega_e t)+\phi_b \quad (1)$$

$$E_2(t)=\overline{E}_0\exp(-i\phi_2)=\overline{E}_0\exp(-i\Delta\omega_e t) \quad (2)$$

where $\Delta\omega_e$ corresponds to wavelength chirping and the phase shift is $\Delta\phi_c=\Delta\omega_e\Delta T$. When these CW light elements interact with each other, the field intensity $E_{int}$ represented by the following equation (3) is obtained, and an output pulse shown at the lowermost position in FIG. 3 is generated.

$$E_{int}=E_2(t)+E_2(t)=2\overline{E}_0\sin(\Delta\omega_e t) \quad (3)$$

Since the field intensity is expressed by using the sine function, no wavelength chirping occurs in the output pulse field. That is, the wavelength chirping $\Delta\omega_e$ present before the CW light elements interact is canceled out. For simplification, in equation (3) $t_1+T_{P1}+T_{Q1}-\Delta T/2$ is regarded as the origin for the timing. The optical path difference between the interference arms is so designed that a bias phase $\Delta\phi_b$ is $\pi$. Although not shown in FIG. 3, a phase converter is inserted into the interference arms, and the optical length difference is stably adjusted in strict wavelength order. An output port 12 in FIG. 3 is an output port for discharging extra CW light. This is required because when the CW light beams cancel each other out and the CW light is not output at the output port 12, the reflection of extra CW light toward the input port is prevented. A wavelength filter 13 in FIG. 1 is provided to remove an input signal pulse, but it is possible to use a polarization filter instead of the wavelength filter 13. When an absorption waveguide is used as a nonlinear waveguide, no filter is required since an input signal pulse will be absorbed by the nonlinear waveguide.

Several typical operating conditions for the present invention will now be explained. One example nonlinear waveguide is a semiconductor light amplifier that has a band gap energy reading of 0.8 to 1.0 eV, and includes a bulk active layer having a thickness of 20 nm to 100 nm. A gain peak wavelength is 1.3 to 1.5 $\mu$m, the maximum gain=10 to 30 dB, and the pulse gain saturated energy reading=1 to 50 pJ. Example active layer and cladding layer materials are $In_{0.63}Ga_{0.37}As0.80P_{0.20}$ and InP. $In_{0.63}Ga_{0.37}As_{0.80}P_{0.20}$ is paired in a grid with an InP substrate, and has a band gap of approximately 0.8 eV (equivalent to a wavelength of 1.5 $\mu$m). A semiconductor light amplifier having a quantum well active layer, an absorption bulk active layer waveguide (the thickness of an active layer is 20 nm to 100 nm), or an absorption quantum well active layer waveguide may be employed. When the nonlinear waveguide has a bulk active layer, it is reported that, with an absorption AlGaAs/GaAs waveguide, a phase shift of $\pi$ is produced by an input signal pulse energy reading of approximately 7 pJ (from the previously mentioned reference, "Applied Physics Letters," by S. Nakamura, et. al., vol. 67, pp. 2445). Similarly, when an absorption type waveguide having an InGaAsP bulk active layer is employed, an energy reading of about 1 pJ to 50 nJ is required. When the bulk active layer light amplifier is employed, the carrier density is greatly changed in accordance with the light amplification operation. As a result, the input energy required for a $\pi$ shift is represented by the following expression (4).

$$\text{(input pulse energy required for absorption nonlinear waveguide)}/\text{(pulse gain)} \quad (4)$$

and when the pulse gain is 20 dB, the energy reading is 10 fJ to 500 fJ. Further, when the active layer of the semiconductor light amplifier is a quantum well type, it is reported that an input pulse of 0.5 to 5.0 pJ is required ("Fall 1996 Applied Physics Academic Lecture Meeting Draft Papers," No. 3, Lecture No. 9a-ZV-1). In this report, the above input energy reading of the semiconductor light amplifier is equivalent to 5 to 500 pJ for an absorption waveguide that has the above described quantum well active layer, and an energy reading greater than that needed for the absorption bulk active layer is sometimes required ("Increase of Change in Band Filling Refractive Index Accompanying Resolving of Spectral Hall Burning," by Ueno, et. al., Spring 1997 Applied Physics Academic Lecture Meeting, Presentation No. 29p-NC9). As is described above, although the input pulse energy required for the operation depends on the structure of a nonlinear waveguide and the operational characteristics, any type of semiconductor light amplifier or semiconductor waveguide that has been reported or has been offered for sale can be applied as the wavelength converter of the present invention.

A specific method for controlling a change in the carrier density shown in FIG. 2B will now be explained. The input pulse energy is employed to control a reduction (or an increase, for an absorption waveguide) in the carrier density inside the light amplifier during a period extending from time $t_1+T_{P1}+T_{Q1}-\Delta T/2$ to time $t_1+T_{P1}+T_{Q1}+\Delta T/2$. It is preferable that the input pulse waveform be rectangular in order to linearly change the carrier density. In addition, injected current is employed to control an increase in the carrier density inside the light amplifier during a period extending from time $t_1+T_{P1}+T_{Q1}+\Delta T/2$ to time $t_1+T_{P1}+T_{Q1}+3\Delta T/2$. The number of carriers injected during time $\Delta T$ is represented by the following equation (5):

$$\Delta N_{IN}=I_{op}\Delta T/q \quad (5)$$

As is shown in equation (3), the signal conversion efficiency of the wavelength converter of the present invention reaches the maximum when the phase shift amount $(\Delta\phi_c=\Delta\phi_e\Delta T)$ is $\pi/2$. The change $\Delta N_{\pi/2}$ in the number of carriers, which is required for the $\pi/2$ phase shifting, is represented as the following equation (6) using input pulse energy $P_\pi$, which is required for $\pi$ phase shifting in the absorption waveguide:

$$\Delta N_{\pi/2}=P_\pi/2qh\omega \quad (6).$$

When $I_{op}$ denotes an injected current, q denotes a primary charge and qhω denotes photon energy (0.8 eV when a wavelength is 1.55 $\mu$m) and when $\Delta N_{IN}=\Delta N_{\pi/2}$, equations (5) and (6) are employed to calculate the injected current $I_{op}^{\pi/2}$, which is required for $\pi/2$ phase shifting, and the following equation (7) is acquired:

$$I_{op}^{\pi/2}=N_\pi/2h\omega\Delta T \quad (7).$$

As an example, when $P_\pi$10 pJ and $\Delta$=10 ns (equivalent to signal pulse repetitive frequency=50 Gb/s, based on repetitive cycle Tn=2$\Delta$T) and hω=0.8 eV (when a wavelength is 1.55 $\mu$m), the injected current $I_{op}^{\pi/2}$, which is required for recovering the $\pi/2$ phase shift, is 550 mA. The $\pi/2$ phase shift is not always required because when the phase shift distance is $\pi/20$, the signal conversion efficiency is deteriorated to $\sin^2(\pi/20)$=2.4%, compared with the $\pi/2$ phase shift, but the injected current required for the operation and the input signal pulse energy can be reduced to $1/10$. In this case, wavelength chirping is also canceled out in accordance with equations (1) and (2).

When the absorption type waveguide is employed, the reduction in the carrier density during a period extending from time $t_1+T_{P1}+T_{Q1}+\Delta T/2$ to time $t_1+T_{P1}+T_{Q1}+3\Delta T/2$ is determined by the life ($\tau_c$) of an optical excitation carrier in the material of the waveguide, and is represented by the following equation (8).

$$\Delta N_{Decay} = N_0\{1 - \exp(\Delta T/\tau_c)\} \quad (8)$$
$$= N_c V\{1 - \exp(\Delta T/\tau_c)\} \approx N_c V\Delta T/\tau_c,$$

where $N_0$ denotes the average count of carriers in the waveguide, $N_c$ denotes the average carrier density and V denotes the average volume of carriers excited by light absorption (equivalent to the volume of the active layer when the signal pulse repetition is fast, as is described above). Since $\Delta T$ is sufficiently shorter than $\tau_c$, as an approximation, the transient change in the carrier density is represented by the following equation (9):

$$\Delta N_{Decay}(t)=N_cV\{1-\exp(t/\tau_c)\}\approx N_cV\times t/\tau_c \quad (9).$$

As a result, as time elapses the carrier density is substantially changed linearly as well as is the density of the light amplifier. An example carrier life that is required for a $\pi/2$ phase shift will now be calculated from $\Delta N_{Decay}=\Delta N_{\pi/2}$. When $N_c$=1×10$^{19}$ cm$^{-3}$, $P_\pi$=10 pJ, $\Delta T$=1 ps, hω=0.8 eV, and the active layer is 50 nm thick, 5 $\mu$m wide and 500 $\mu$m long, $\tau_c$=340 ps. The life of the carrier in the waveguide can be controlled by the application of an electrostatic field, impurity doping, ion injection, low temperature growing and the application of an average carrier density. In this embodiment, an electrostatic field of approximately 10 kV/cm is applied in order to emit carriers ("Applied Physics Letters," by S. Nakamura, et. al., vol. 62, No. 9, pp. 925–927, 1993).

Although in the first embodiment the symmetrical Mach Zender wavelength converter has been described, the method of the present invention can be applied for other wavelength converters that have the same operating principles, such as the previously mentioned wavelength converter invented by S. Nakamura (Japanese Unexamined Patent Publication No. Hei 7-199240), a polarization-discrimination type Mach Zender wavelength converter ("Applied Physics Letters," by K. Tajima, et. al, vol. 67, pp. 3709–3711, 1995), and an UNI wavelength converter, which is a modification of the above converter ("IEEE Photonics Technology Letters," by N. S. Patel, et. al., vol. 8, pp. 1695–1697, 1996).

Figure 4:
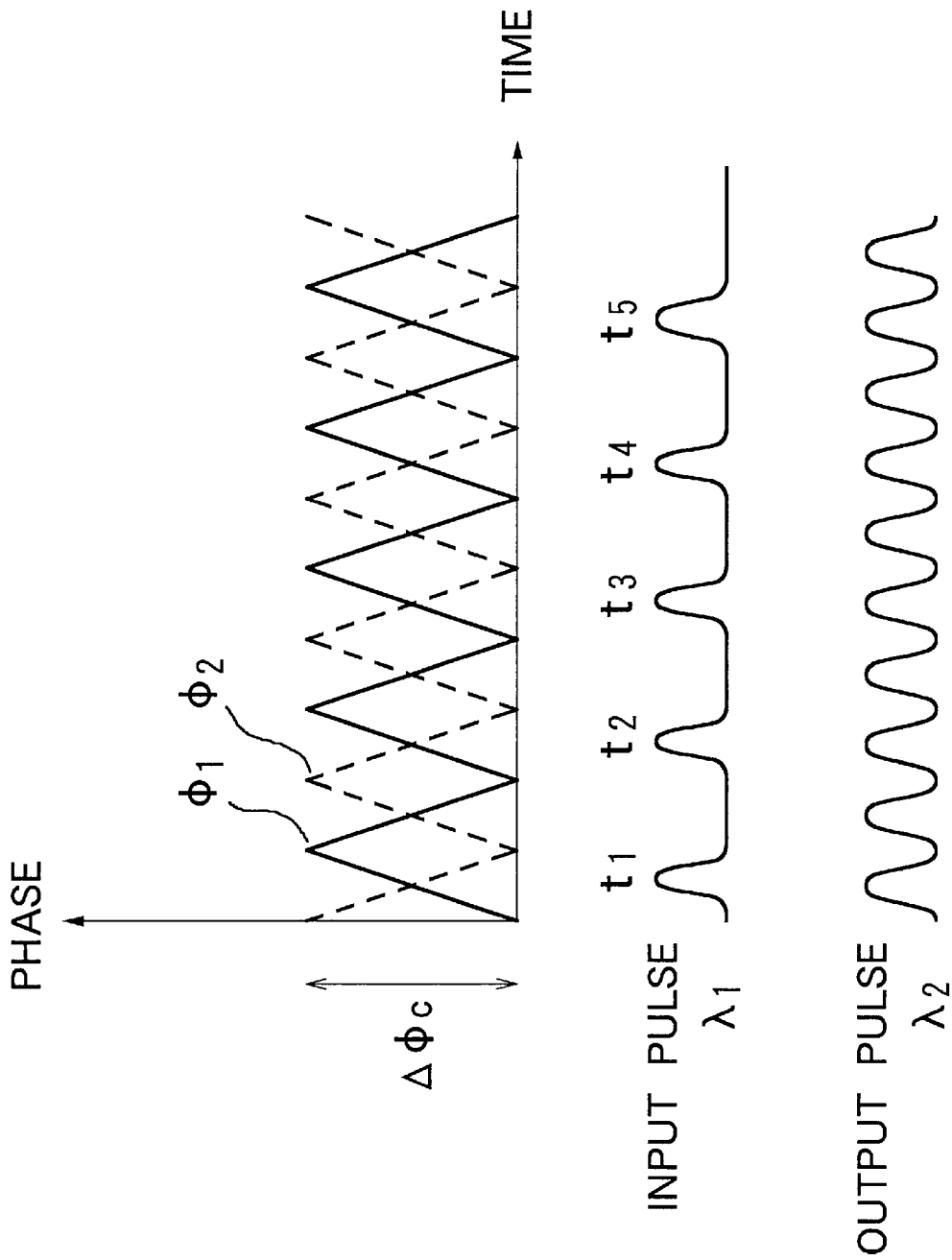
FIG. 4 is a diagram explaining the process performed by the present invention.

A wavelength converter according to a second embodiment of the present invention will now be described. The only difference from the wavelength converter of the first embodiment is a phase shift distance. For the wavelength converter in this embodiment, the phase shift distance $\Delta\phi_c$ is set to $n\pi/2$ (n=2, 3, . . . ). An example phase transition when a signal pulse string (a clock signal string) is input is shown in FIG. 4. As is apparent from equation (3), when n=2 ($\Delta\phi_c=\pi$) a signal pulse string having twice the repetitive frequency of the input signal pulse string is output, and when $\Delta\phi_c=n\pi/2$ the repetitive frequency is increased to n times. All the structures and the operating conditions of the wavelength converter in the first embodiment can be applied for the wavelength converter in the second embodiment. When the input pulse energy, the injected current (for a light amplifier) and the carrier life (for an absorption waveguide) are controlled and the operating condition ($\Delta\phi=n\pi/2$) is set, the wavelength converter in the second embodiment is completed. The control method is the same as was explained for the first wavelength converter.

According to the present invention, the first wavelength converter can output a wavelength conversion signal for which a wavelength chirping does not occur. An output signal having no wavelength chirping can be transmitted for a long distance with little signal distortion.

Further, according to the present invention, the second wavelength converter can generate a high-frequency light pulse string using a low-frequency light pulse string source, i.e., a slow-repetition light pulse string source.

Although the present invention has been explained while referring to the embodiments, the present invention is not limited to these embodiments and can be variously modified or improved within the range of the knowledge of one having ordinary skill in the art.

What is claimed is:

1. A wavelength converter comprising:

a port which receives an input signal pulse light at a pulse interval;

a first and second non-linear waveguide, each non-linear waveguide having an input and an output;

a light delay circuit which receives the input signal pulse light, branches the input signal pulse light into first and second signal pulse lights, adds a different delay to each of the two signal pulse lights by passing the signal pulse lights through optical paths of different lengths thereby producing delayed first and second signal pulse lights, transmits the delayed first signal pulse light to the first non-linear waveguide, and transmits the delayed second sional pulse light to the second non-linear waveguide;

a continuous-wave light source which produces a continuous wave light signal;

a branching section which branches the continuous wave light signal into a first continuous wave light signal and a second continuous wave light signal, the branching section further feeds the first continuous wave light signal to the input of the first non-linear waveguide and feeds the second continuous wave light signal to the input of the second non-linear waveguide; and a combiner section which combines the outputs of the first and second non-linear waveguides;

wherein a condition $\Delta L_d = v_g T_o/2$ is satisfied, with $\Delta L_d$ denoting the difference in the optical paths, $T_o$ denoting the input signal pulse interval, and $v_g$ denoting a speed at which a signal pulse light proceeds through the light delay circuit.

2. A wavelength converter according to claim 1, wherein the first and second non-linear waveguides produce a $\pi/2$ or greater change in their respective refractive indices, and the first and second non-linear waveguides output a signal pulse having a frequency which is an integral multiple of that of the input signal pulse.

3. A wavelength converter according to claim 1, wherein at least one of the branching section, the combiner and the light delay circuit is formed using a semiconductor waveguide, quartz waveguide, or an optical fiber.

4. A wavelength converter according to claim 1, wherein the first and second non-linear waveguides are semiconductor light amplifiers.

5. A wavelength converter according to claim 1, wherein the first and second non-linear waveguides are semiconductor waveguides into which no current is injected.

6. A method for removing wavelength chirping from a wavelength converter, the method comprising:

receiving an input signal pulse light at a pulse interval;

branching the input signal pulse into a first and second signal pulse light;

passing the first and second signal pulse lights through distinct optical paths having differing lengths thereby producing delayed first and second signal pulse lights;

sending the delayed first signal pulse light to a first non-linear waveguide;

sending the delayed second signal pulse light to a second non-linear waveguide;

inputting a continuous wave light into the first and second non-linear waveguide; and combining the outputs of the first and second non-linear waveguide;

wherein the signal pulse lights are inputted at an interval of $T_o$ between input signal pulses such that a condition $\Delta L_d = v_g T_o/2$ is satisfied, with $\Delta L_d$ denoting the difference in the optical paths and $v_g$ denoting a speed at which the signal pulse lights proceed through said light delay circuit.

7. A method according to claim 6, wherein the signal pulse lights are inputted so that a $\pi/2$ or greater change in the refractive index of the first and second nonlinear waveguides is effected in order to output a signal pulse light having a frequency which is an integral multiple of the frequency of the input pulse signal.

* * * * *